May 16, 1967

P. BARIGANT 3,319,460

DEVICE FOR DETERMINING THE MODULUS OF YOUNG
OF VISCO-ELASTIC MATERIALS
Filed April 10, 1964

Inventor:
Pierre Barigant
By Kemon, Palmer, Stewart
& Estabrook,
Attorneys

United States Patent Office 3,319,460
Patented May 16, 1967

3,319,460
DEVICE FOR DETERMINING THE MODULUS OF YOUNG OF VISCO-ELASTIC MATERIALS
Pierre Barigant, Paris, France, assignor to L'Electronique Appliquee, Paris, France
Filed Apr. 10, 1964, Ser. No. 358,875
Claims priority, application France, June 5, 1963, 937,098, Patent 1,366,902
6 Claims. (Cl. 73—67.2)

The present invention concerns improvements in or relating to the determination of the modulus of Young of visco-elastic materials such as plastic materials, for which the ratio of the pass-band of the resonance curve to the resonance frequency does not substantially exceed ten percent.

It is known that the modulus of Young of such a kind of materials is given by the relation:

(i) $\quad E = E' + J.E'' = E'.(1 + j. \text{tg } \delta)$ where $J$ and $j$ are the complex number $(-1)^{1/2}$, and that the real part $E'$ of the modulus is given by the relation:

(ii) $\quad E' = K.(F^2 + \Delta F^2/2).(m/b).(L/e)^3$ wherein F is the resonance frequency, $\Delta F$ is the pass band of the resonance curve defined for an attenuation of $1/\sqrt{2}$, L is the length of a test-piece of the concerned material, $e$ is the thickness of said piece, $m$ is its mass and $b$ is its width, K being a coefficient depending upon the vibration mode and the ratio of the mass of the test-piece to the mass of the moving part of the system driving said test-piece into vibration; it is further known that tg $\delta$, ratio of the imaginary part $E''$ to the real part $E'$ of the complex modulus is given by either one of the following relations:

(iii) $\quad \text{tg } \delta = \Delta F / F$ or (iv) $\quad \text{tg } \delta = R.\sqrt{(a/A)^2 + c}$ wherein R is the value of the above defined mass ratio, A is the mechanical amplification coefficient defined by the ratio of the oscillation amplitudes at one end and at the middle of the test-piece, $a$ and $c$ are formally known coefficients.

A device according to the present invention is mainly characterized in that it comprises the combination of driving means for vibrating a test-piece of the material to be studied, means for adjusting the drive to a resonance condition of vibration for said test-piece, means for measuring the frequency (or period) of said vibration, and means for measuring according to the wish of the operator, the pass band of the resonance curve as defined for an absolute attenuation equal to $1/\sqrt{2}$ and the coefficient of mechanical amplification between an end and the middle of the said test-piece.

Figure 1:
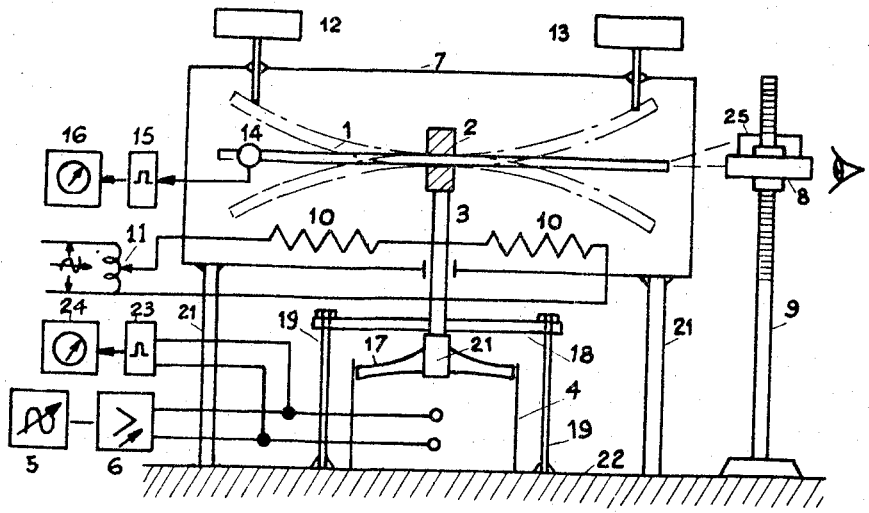
Figure 2:
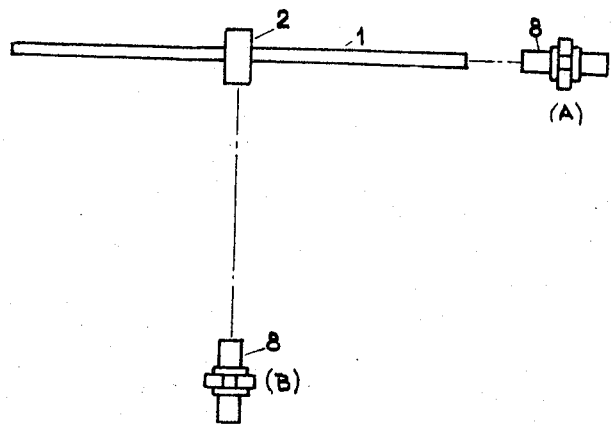

In the accompanying drawings:

FIG. 1 shows an elevation view of an illustrative embodiment of such a device; and, FIG. 2 shows a top partial view of said device.

Any technological structural detailed modification of such an embodiment will remain within the scope of the invention as defined by the appended claims.

The test-piece 1 is mounted in a support 2 by which it is vibrated at its middle. This support is secured to a rod 3 driven into vibration from the spider 17 of a vibrating tank 4 and to which it is connected by a plunger 21. Said spider 17 has an insufficient mass so that a stretcher 18 is provided for ensuring to the vibrating rod a substantially constant response at any frequency for a same amplitude of the oscillation of the vibrating tank. The stretcher 18, which may or may not be metallic, is carried by such rods as 19 on the bedplate 22.

The energization of the vibrating tank 4 is controlled from an adjustable frequency generator 5 through a wide band amplifier 6, from 1 to 10,000 c.p.s. for instance for a generator the oscillation frequency of which may be adjusted from 1 to 5000 c.p.s. Such an arrangement enables the exploration for each test-piece of at least the two first vibrating modes in order to obtain a measurement of the Young modulus in a wide range of visco-elastic materials.

The test-piece and support thereof are contained within a thermostatic enclosure 7 carried on the bedplate by such carriers as 21. Said enclosure is preferably all translucent though two walls only may suffice in this respect, one permitting to see the test-piece by one end and the other by profile. Within the enclosure are arranged heating resistors 10 supplied from an auto-transformer or the like 11 and thermistor probes, for instance, such as 12 and 13 enabling a permanent control of the internal temperature of said enclosure. It is very important for the visco-elastic materials that said temperature be precisely defined at each test. The frequency of the oscillation may be measured by one of the two shown arrangements: either at the output of the amplifier 6 by a derivation of the sine wave signal shaped as at 23 by any known circuit delivering square wave signals, the periodicity of such a square wave signal being measured at 24 by a precision instrument for determining the time period of square waves in the signal such as a five digit counter for instance. Preferably, the periodicity of vibrations of the test-piece 1 may be measured by a photo element such as a photo transistor 14 placed adjacent to the test-piece such that movement of the test-piece will interrupt a beam of light impinging on the photo element to thereby cause it to produce a signal, the frequency of which is directly proportional to the vibrational frequency of the test-piece 1. The output signal from the photo element 14 may be shaped as at 15 in a manner similar to the squaring circuit 23 and its periodicity measured at 16 in a manner similar to that accomplished by the counter 24. Both instrumentations may preferably be provided in order to check the results from one of them by the results from the other one, thus detecting when necessary a default of transmission between the generator 5 and the support 2 of the test-piece. A frequency comparator may be connected between 16 and 24, if desired, for providing a display of any departure between the measured periodic values. In the above mathematical relations, it suffices to substitute for the frequency F its equivalent $1/T$, where T is the period of one complete vibration of the test-piece 1.

An observation instrument is associated to the above-described means. Said instrument is essentially made of a sighting glass 8 mounted on a vertical rod provided with a vernier rule 9. A lighting arrangement 25, such for instance as an observation lamp in stroboscopic light synchronized with the oscillation of the test-piece is affixed to the sighting glass mounting fixture. Such an instrument may be displaced on the bedplate in order to be brought as well laterally, position (A) in FIG. 2, as frontly of the middle of the test-piece, position (B) in said FIG. 2.

The operating mode may now be explained as follows: the test-piece is mounted in its support with a good definition of centering its middle in said support. The temperature of the enclosure is brought to a predetermined value from adjusting the tap of the transformer 11. The generator is started and the test-piece is observed by its end view. The operator adjusts the frequency of the generator until the amplitude of vibration of the test-piece comes to a maximum value for a resonance mode of vibration. As long as the gain of the amplifier 6 is not modified, the amplitude of vibration of the tank, hence of the support 2, remains substantially constant independently of the generator frequency. Once the adjustment is made, one at least of the instruments 24 or 16 is read out so that the resonance frequency is known and thereafter, the sighting glass is displaced on its vernier rule 9 in a ratio equal to $1/\sqrt{2}$ and the frequency of the generator is re-adjusted so that the amplitude of the displacement of the end of the test-piece corresponds to the sight defined by such a new adjustment. The difference of values between the two frequencies defines $\Delta F$. As the operator is already in possession of the characteristic values of the test-piece and its mounting arrangement, as well as the values of the constant coefficients in the relations supra, he can compute $E'$ and also tg $\delta$. For this latter factor, the operator further may displace the sighting glass on its carrier on the bedplate from position (A), after he had read the resonance frequency, to the position (B) and without modification of 5 and 6, may measure the displacement of the support 2 at the center of the test-piece. Consequently, the operator can compute the mechanical amplification coefficient A and, from relation (iv), compute the value of tg $\delta$ without modification of the resonance. It is a matter of choice since no additional means is necessary for computing tg $\delta$ according to the one or the other of the above defined methods.

What is claimed is:

1. A device for the determination of the modulus of Young of a visco-elastic material comprising the combination of a thermostatic enclosure housing a supporting arrangement for a test-piece, said enclosure having at least one translucent lateral wall and one translucent end wall, a support within said enclosure for supporting a test-piece parallel to said translucent lateral and end walls at its mid-section and for vibrating said test-piece, a rod affixed to said support by one end and affixed by its other end to a spider of a vibrating tank where said vibrating tank is provided with an energizing coil arrangement, electric oscillation generating means for driving said tank, means for adjusting the frequency and the amplitude of such oscillation, frequency measuring means operatively associated with said device for measuring the frequency of vibrations of said test-piece, and means for sighting and measuring the amplitude of the displacements of the test-piece through said translucent walls, said latter means comprising at least one sighting glass supported adjustably on a carrier provided with a vernier rule and a light source for said sighting glass.

2. A device according to claim 1, wherein said oscillating means comprise an adjustable frequency generator followed by a wide band amplifier of adjustable gain, the output of said amplifier feeding the energizing coil arrangement of said vibrating tank and wherein the spider of said tank cooperates with a stretcher in order that the amplitude of vibration of the support of the test-piece remains substantially constant at any frequency unless the gain of the amplifier is modified.

3. A device according to claim 1 wherein said frequency measuring means is connected to the output of said frequency adjusting means.

4. A device according to claim 1, wherein in the light source is a stroboscopic one supported on said carrier by said sighting glass support.

5. A device according to claim 4, wherein the unit comprising the sighting glass and the support for said sighting glass, the light source, and the carrier for said named elements is displaceable on a bedplate of the device from an end view position to a position opposite the translucent lateral wall to view of the midsection of the test-piece with respect to the enclosure.

6. A device according to claim 1 wherein said frequency measuring means includes means positioned adjacent to said test piece for generating an electrical signal in response to vibrations of said test-piece, the frequency of said signal being directly proportional to the frequency of vibration of said test piece.

References Cited by the Examiner

UNITED STATES PATENTS 2,355,194   8/1944   Wiggins _____ 73—67.1
2,960,862   11/1960   Spurr et al. _____ 73—67.2

OTHER REFERENCES

An article by Van Oort entitled, "A Method for the Measurement of Dynamic Mechanical Properties of Small Samples of Plastic Material," from vol. VII, No. 5, of Microtechnic, 1952, pp. 246–8.

RICHARD C. QUEISSER, *Primary Examiner.*

L. R. FRANKLIN, *Examiner.*

J. J. GILL, *Assistant Examiner.*